(12) United States Patent
Diekmann et al.

(10) Patent No.: US 10,479,733 B2
(45) Date of Patent: Nov. 19, 2019

(54) POWDER COMPRISING POLYMER-COATED CORE PARTICLES COMPRISING METALS, METAL OXIDES, METAL NITRIDES OR SEMIMETAL NITRIDES

(75) Inventors: Wolfgang Diekmann, Waltrop (DE); Franz-Erich Baumann, Duelmen (DE); Maik Grebe, Bochum (DE); Kristiane Warnke, Recklinghausen (DE); Sylvia Monsheimer, Haltern am See (DE)

(73) Assignee: Evonik Degussa GmbH, Essen (DE)

( * ) Notice: Subject to any disclaimer, the term of this patent is extended or adjusted under 35 U.S.C. 154(b) by 675 days.

(21) Appl. No.: 13/537,148

(22) Filed: Jun. 29, 2012

(65) Prior Publication Data

US 2013/0011660 A1  Jan. 10, 2013

(30) Foreign Application Priority Data

Jul. 6, 2011 (DE) .......................... 10 2011 078 720

(51) Int. Cl.

| | | |
|---|---|---|
| B32B 27/20 | (2006.01) | |
| B32B 5/16 | (2006.01) | |
| B22F 3/10 | (2006.01) | |
| B32B 15/08 | (2006.01) | |
| B05D 7/00 | (2006.01) | |
| B29C 67/24 | (2006.01) | |
| C04B 35/628 | (2006.01) | |
| B33Y 70/00 | (2015.01) | |
| B22F 3/105 | (2006.01) | |
| B29C 67/04 | (2017.01) | |
| C04B 35/626 | (2006.01) | |
| C04B 35/634 | (2006.01) | |
| C09C 3/10 | (2006.01) | |
| C09D 177/02 | (2006.01) | |
| B22F 1/02 | (2006.01) | |
| B22F 1/00 | (2006.01) | |
| B29C 64/153 | (2017.01) | |

(52) U.S. Cl.
CPC .......... *C04B 35/628* (2013.01); *B22F 1/0062* (2013.01); *B22F 1/02* (2013.01); *B22F 3/1055* (2013.01); *B29C 64/153* (2017.08); *B29C 67/04* (2013.01); *B33Y 70/00* (2014.12); *C04B 35/6264* (2013.01); *C04B 35/62897* (2013.01); *C04B 35/634* (2013.01); *C04B 35/63468* (2013.01); *C09C 3/10* (2013.01); *C09D 177/02* (2013.01); *C01P 2002/88* (2013.01); *C01P 2004/62* (2013.01); *C01P 2004/84* (2013.01); *C01P 2006/12* (2013.01); *C04B 2235/3217* (2013.01); *C04B 2235/3852* (2013.01); *C04B 2235/5409* (2013.01); *C04B 2235/5436* (2013.01); *C04B 2235/6026* (2013.01); *C04B 2235/665* (2013.01); *Y02P 10/295* (2015.11); *Y10T 428/25* (2015.01); *Y10T 428/2998* (2015.01)

(58) Field of Classification Search
None
See application file for complete search history.

(56) References Cited

U.S. PATENT DOCUMENTS

| | | | |
|---|---|---|---|
| 4,334,056 A | 6/1982 | Meyer et al. | |
| 4,687,838 A | 8/1987 | Mumcu et al. | |
| 4,689,364 A | 8/1987 | Mumcu et al. | |
| 5,215,855 A * | 6/1993 | Keoshkerian | G03G 9/09328 430/124.31 |
| 5,270,445 A * | 12/1993 | Hou | 430/137.1 |
| 5,562,978 A * | 10/1996 | Jacobson | 428/323 |
| 6,042,937 A * | 3/2000 | Hayashi | C01G 23/047 428/323 |
| 6,136,948 A | 10/2000 | Dickens, Jr. et al. | |
| 6,245,281 B1 | 6/2001 | Scholten et al. | |
| 7,402,330 B2 | 7/2008 | Pfeifer et al. | |
| 7,879,938 B2 | 2/2011 | Hager et al. | |
| 7,887,740 B2 | 2/2011 | Simon et al. | |
| 2002/0069790 A1* | 6/2002 | Hayashi et al. | 106/482 |
| 2006/0159896 A1 | 7/2006 | Pfeifer et al. | |
| 2007/0183918 A1 | 8/2007 | Monsheimer et al. | |

(Continued)

FOREIGN PATENT DOCUMENTS

| | | |
|---|---|---|
| DE | 29 06 647 | 4/1980 |
| DE | 35 10 687 | 9/1986 |

(Continued)

OTHER PUBLICATIONS

U.S. Appl. No. 13/012,283, filed Jan. 24, 2011, US2011/0118410 A1, Simon, et al.

Search Report dated Sep. 28, 2012 in European Application No. 12172670.7 (With English Translation of Category of Cited Documents).

(Continued)

*Primary Examiner* — Ronak C Patel

(74) *Attorney, Agent, or Firm* — Oblon, McClelland, Maier & Neustadt, L.L.P.

(57) ABSTRACT

Composite particles comprising core particles completely or partially coated with a precipitated polymer, where the $d_{50}$ median diameter of the core particles is 1 µm or greater and the ratio of the $d_{50}$ median diameter of the composite particles to the $d_{50}$ median diameter of the core particles is 1.15 or greater, are provided. A method to prepare the particles includes dissolution of a polymer in a solvent and reprecipitation of the polymer in the presence of a suspension of the core particles. Further provided is a layer by layer moulding process employing the composite particles and mouldings obtained therefrom.

12 Claims, No Drawings

(56) References Cited

U.S. PATENT DOCUMENTS

| | | |
|---|---|---|
| 2007/0238056 A1 | 10/2007 | Baumann et al. |
| 2007/0267784 A1 | 11/2007 | Greiner |
| 2008/0096031 A1* | 4/2008 | Amouroux .................... 428/458 |
| 2008/0139756 A1* | 6/2008 | Christian et al. ............. 525/477 |
| 2008/0249237 A1 | 10/2008 | Hager et al. |
| 2009/0117369 A1* | 5/2009 | Jaworowski et al. ........ 428/332 |
| 2011/0028589 A1* | 2/2011 | Saimi et al. .................. 523/115 |
| 2012/0045515 A1* | 2/2012 | Liu et al. ...................... 424/489 |
| 2012/0077405 A1* | 3/2012 | Zhou ........................ D01D 5/00 442/346 |
| 2012/0285349 A1* | 11/2012 | Michos et al. ................. 106/462 |
| 2012/0288716 A1* | 11/2012 | Ueda ............................ 428/406 |
| 2013/0344325 A1* | 12/2013 | Nguyen .................... B32B 5/10 428/343 |

FOREIGN PATENT DOCUMENTS

| | | |
|---|---|---|
| DE | 35 10 691 | 9/1986 |
| DE | 44 21 454 | 12/1995 |
| DE | 197 47 309 | 4/1999 |
| DE | 102 27 224 | 1/2004 |
| DE | 10 2004 003 485 | 9/2004 |
| DE | 10 2004 001 240 A1 | 8/2005 |
| DE | 10 2004 012 682 | 10/2005 |
| DE | 10 2004 012 683 | 10/2005 |
| DE | 10 2004 020 452 | 12/2005 |
| EP | 1015214 | 7/2002 |
| WO | 95/11006 | 4/1995 |
| WO | 96/06881 | 3/1996 |
| WO | 01/38061 | 5/2001 |
| WO | WO 03/106146 A1 | 12/2003 |
| WO | 2007/051691 | 5/2007 |

OTHER PUBLICATIONS

J. Christian Nelson, et al., "Selective Laser Sintering of Polymer-Coated Silicon Carbide Powders", Ind. Eng. Chem. Res., vol. 34, 1995, XP001108931, pp. 1641-1651.

N.K. Vail, et al., "Silicon Carbide Preforms for Metal Infiltration by Selective Laser Sintering™ of Polymer Encapsulated Powders", Solid Freeform Symposium Proceedings, Jan. 1, 1992, XP55037969, pp. 204-214.

J. P. Kruth, et al., "Consolidation Phenomena in laser and powder-bed based layered manufacturing", CIRP Annals, vol. 56, No. 2, Nov. 22, 2007, XP022356747, pp. 730-759.

Jianhong Wang, et al., "Processing and characterization of core-shell PA12/silica composites produced by selective laser sintering", Advanced Materials Research, vols. 160-162, 2011, XP009162752, pp. 756-761.

Xuefeng Ding, et al., "Silica nanoparticles encapsulated by polystyrene via surface grafting and in situ emulsion polymerization", Materials Letters, vol. 58, 2004, XP004547914, pp. 3126-3130.

* cited by examiner

POWDER COMPRISING POLYMER-COATED CORE PARTICLES COMPRISING METALS, METAL OXIDES, METAL NITRIDES OR SEMIMETAL NITRIDES

CROSS REFERENCE TO RELATED APPLICATIONS

This application claims priority to German Application No. DE 102011078720.8, filed Jul. 6, 2011, the disclosure of which is incorporated herein by reference in its entirety.

BACKGROUND OF THE INVENTION

Field of the Invention

The invention relates to a powder comprising composite particles, which provides advantages in terms of density and the stability of the production process, to the use of the powder in shaping processes, and also to mouldings produced with the powder by a layer-by-layer process by which regions of a powder layer are selectively melted. After cooling and solidification of the regions previously melted layer-by-layer, the moulding can be removed from the powder bed. The mouldings according to the invention moreover exhibit less susceptibility to warpage than conventional mouldings.

A task frequently encountered in very recent times is the rapid provision of prototypes. Particularly suitable processes are those which are based on pulverulent materials and in which the desired structures are produced layer-by-layer through selective melting and solidification. Supportive structures for overhangs and undercuts can be omitted in this method, because the powder bed surrounding the molten regions provides sufficient support. The method is additionally advantageous because there is no need for the subsequent operation of removing supports. The processes may also be suitable for producing short runs.

The selectivity of the layer-by-layer process may be obtained by applying susceptors, absorbers, or inhibitors, or by masks, or by focussed introduction of energy, for example through a laser beam, or by way of glass fibres. The energy may also be introduced as a form of electromagnetic radiation.

A process which has particularly good suitability for the purpose of rapid prototyping is selective laser sintering. In this process, plastics powders are briefly irradiated selectively in a chamber by a laser beam, and the powder particles which encounter the laser beam therefore melt. The molten particles coalesce and rapidly resolidify to give a solid mass. This process can provide simple and rapid production of three-dimensional products by repeated irradiation of a succession of freshly applied layers.

The laser sintering (rapid prototyping) process for producing mouldings from pulverulent polymers is described in detail in the U.S. Pat. No. 6,136,948 and WO 96/06881. A wide variety of polymers and copolymers, including polyacetate, polypropylene, polyethylene, ionomers and polyamide are disclosed as being useful in a laser sintering process.

Other processes with good suitability are the selective inhibition bonding (SIB) processes described in WO 01/38061, and a process described in EP 1 015 214. Both processes operate with large-surface-area infrared heating for melting of the powder. The selectivity of the melting process is achieved in the first case by applying an inhibitor, and in the second process it is achieved by a mask. DE 103 11 438 describes another process. In this, the energy required for the fusion process is introduced through a microwave generator, and the selectivity is achieved by applying a susceptor.

Other suitable processes are those operating with an absorber which is either present in the powder or is applied by ink jet processes, as described in DE 10 2004 012 682.8, DE 10 2004 012 683.6 and DE 10 2004 020 452.7.

The rapid prototyping or rapid manufacturing processes mentioned (RP or RM processes) can use pulverulent substrates, in particular polymers, preferably selected from polyesters, polyvinyl chloride, polyacetal, polypropylene, polyethylene, polystyrene, polycarbonate, poly(N-methylmethacrylimides) (PMMI), polymethyl methacrylate (PMMA), ionomer, polyamide, or a mixture thereof.

WO 95/11006 describes a polymer powder which is suitable for the laser sintering process and which, when melting behaviour is determined by differential scanning calorimetry with a scanning rate of form 10 to 20° C./min, exhibits no overlap of the melting and recrystallization peak, has a degree of crystallinity of from 10 to 90%, likewise determined by DSC, has a number-average molecular weight Mn of from 30 000 to 500 000, and has a Mw/Mn quotient in the range from 1 to 5.

DE 197 47 309 describes the use of a nylon-12 powder which has increased melting point and increased enthalpy of fusion and which is obtained by reprecipitation of a polyamide previously produced through ring-opening and subsequent polycondensation of laurolactam. This is a nylon-12.

DE 10 2004 003 485 describes the use of particles with at least one cavity for use in processes that build layers. All of the particles here comprise at least one cavity, and the particles comprising the cavity are melted by introduction of electromagnetic energy. The powder particles described have a thin surface layer.

DE 102 27 224 describes a granulated material which is intended for 3D binder printing and which is composed of particles provided with a surface layer comprising a nonpolar external area. The surface layer of the powder particles described is, however, thin.

In the conventionally known methods described above, the powders are sometimes mixed with other particles for reinforcement, e.g. metal particles, glass particles or $TiO_2$ particles. However, a disadvantage encountered with such mixing is that the handling of powder mixtures of this type often leads to demixing phenomena, and the mechanical properties that the reinforcing material is intended to achieve therefore sometimes vary. The regions where the proportion of fillers is too high become very brittle and therefore unusable, and the regions comprising too little filler are softer than intended. The demixing derives from the different density of the polymer particles and of the fillers, and tends to be apparent to some extent during any transport of the powder mixture and during its handling. In particular if the handling of the powder is automated in the rapid manufacturing process, it is difficult to control deviations in the properties of the components produced.

WO 2007/051691 describes processes for producing ultra-fine powders based on polyamides, by precipitating polyamides in the presence of inorganic particles, where a suspension is used with inorganic particles suspended in the alcoholic medium, where the $d_{50}$ median size of the inorganic particles is in the range from 0.001 to 0.8 µm. Fine polyamide powders were obtained according to this reference, and, because of their small size, the inorganic particles have uniform distribution in the composite particles. The process was aimed at achieving colouring of the powder and of the moulding formed therefrom. The measure does not alter the mechanical properties of the moulding.

Therefore, one object of the present invention is to eliminate the problem of the demixing phenomenon and to achieve an improvement in the consistency of mechanical properties which the reinforcing material is intended to achieve in the moulding.

Another object of the invention is to provide a process for producing moulded articles which yield mouldings of consistently good quality.

SUMMARY OF THE INVENTION

These and other objects have been achieved by the present invention, the first embodiment of which includes a powder, comprising composite particles:

wherein the composite particles, comprise:
a core particle having a $d_{50}$ median diameter of 1 μm or greater; and
at least a partial coating of a polymer on the core;
wherein a ratio of the $d_{50}$ median diameter of the composite particles to the $d_{50}$ median diameter of the core particles is 1.15 or greater, and
a melting point of the coating polymer is obtainable when the polymer is exposed to an electromagnetic energy.

In a first preferred embodiment, the core particle of the composite particle is at least one material selected from the group consisting of a metal, a metal oxide, a metal nitride, and a semimetal nitride.

In a second preferred embodiment, the polymer of the coating of the composite particle comprises at least one polymer selected from the group consisting of a polyolefin, a polyethylene, a polypropylene, a polyvinyl chloride, a polyacetal, a polystyrene, a polyimide, a polysulphone, a poly(N-methylmethacrylimide) (PMMI), a polymethyl methacrylate (PMMA), a polyvinylidene fluoride (PVDF), an ionomer, a polyether ketone, a polyaryl ether ketone, a polyamide, and a copolyamide.

In another preferred embodiment of the invention the core particles comprise metal particles having a $d_{50}$ median diameter of from 1 to 100 μm.

In a further embodiment, the invention includes a process for producing the composite particles, the process comprising:

at least partially dissolving a polymer for the coating in a medium comprising a solvent which at least partially dissolves the polymer;
adding the core particles to the medium, before, during or after at least partially dissolving the polymer;
suspending the core particles in the medium; and then
precipitating the polymer from the at least partial solution onto the core particles to obtain the composite particles;
wherein the $d_{50}$ median diameter of the core particles is 1 μm or greater and the ratio of the $d_{50}$ median diameter of the composite particles to the $d_{50}$ median diameter of the core particles is 1.15 or greater.

In another embodiment, the invention includes a process for producing a moulded article, the process comprising:
applying a layer of the composite powder according to the present invention;
selectively melting at least one region of the layer by introduction of electromagnetic energy;
allowing the melted region to solidify;
applying another layer of composite powder and repeating the melting and solidification to perform a layer-by-layer process in which a molding having a structure according to the selective treatment is obtained;
wherein the melting selectivity is achieved by applying susceptors, inhibitors, or absorbers to each applied layer or by applying a mask to the applied layer.

Throughout the following description of the invention numerical ranges and values provided include all values and subvalues therebetween as well as all intermediate ranges within the stated range values.

DETAILED DESCRIPTION OF THE PREFERRED EMBODIMENTS

One technical object of the invention may be achieved through a powder for use in a layer-by-layer process for producing mouldings by selectively melting regions of the respective powder layer through introduction of electromagnetic energy. The powder according to the present invention comprises composite particles, which comprise:

a core particle having a $d_{50}$ median diameter of 1 μm or greater; and
at least a partial coating of a polymer on the core;
wherein a ratio of the $d_{50}$ median diameter of the composite particles to the $d_{50}$ median diameter of the core particles is 1.15 or greater, and
a melting point of the coating polymer is obtainable when the polymer is exposed to an electromagnetic energy.

The data for the diameters of the core particles is based on the particles which provide the core in the composite particle to be formed.

The layer-by-layer process for producing mouldings is preferably selective laser sintering.

Because of the firm bond between polymer and filler, the powder according to the present invention is no longer subject to the problems of demixing, and this leads to an improvement in consistency of mechanical properties in the moulding produced from the powder. Since demixing no longer occurs in the powder according to the invention, it is possible to use the powder in construction processes to produce uniform components and components with uniform quality. The durably uniform constitution resulting from the firm bond between polymer and core particle may significantly improve the recyclability of the powder, even when a plurality of stages are involved. The size of the core particles moreover provides advantages with respect to less dusting and less static charging during handling of the core particles, and also of the composite particles per se. In the precipitation process, the flowability of the suspension is higher with larger particles (i.e. with particles measuring 1 μm or greater) when comparison is made with particles in the nanometer range, because the contact area of the larger particles is smaller. There may also be advantages in the use of the powders according to the invention: the powders according to the invention may be stored, transported and used in larger packaging units without any possibility of demixing. Feed quantities of the product may therefore also be greater during the laser sintering process, i.e. more powder can be charged to the sample feed container, and/or the dimensions of the sample feed container can be greater, without any resultant adverse effect on the quality of the resultant components. Furthermore, fluidization in the feed does not lead to the demixing that is relatively frequently observed in conventionally known systems. Because the powders of the present invention have an exterior shell made of polymer, the introduction of energy by the laser may also be more uniform. In conventional powders as described above, the laser sometimes encounters a polymer particle and sometimes encounters a filler particle. As a function of filler type, the result can vary in extreme cases from almost complete absorption to almost complete reflection of the energy. Powders according to the present invention advantageously avoid these problems.

It has now been found that, by using core particles with a $d_{50}$ median diameter of 1 μm or greater, as reinforcing material firmly bonded to polymer (composite particles), it may be possible, through a layer-by-layer process (in which regions of the respective powder layer are selectively melted) to produce mouldings which have advantages in relation to density and susceptibility to warpage and with this have better properties in relation to consistency of processing than those made of a standard reinforced polymer powder mixture. The use of metal particles and/or metal oxide particles, metal nitride particles or semimetal nitride particles moreover increases thermal conductivity and electrical conductivity.

In one preferred embodiment, the core particles to be coated with the precipitated polymer have been selected from metal, metal oxides, metal nitrides or semimetal nitrides. The particles made of metal or metal oxides represent the core in the composite particle. The powder according to the present invention preferably has a core-shell structure.

The metal core particles may include metal such as steel, silver, copper, or aluminium as well as other metals or alloys known to one of skill in the art. The metal particles may be solid or may be of other forms such as hollow beads or platelets. The use of a powder with a core made of metal in a layer-by-layer process for producing mouldings may also provide an optical effect, in addition to the reinforcement and other abovementioned advantages. Further advantages may be obtained through an increase in thermal conductivity and/or electrical conductivity. The use of a powder with a core made of silver for producing mouldings may be advantageous for provision of an antimicrobial effect. The use of copper as core of the powder may have a stabilizing effect. The use of a powder with a core made of steel for producing mouldings may provide, along with a reinforcing effect, a metallic appearance, an increase of thermal conductivity and easier downstream operations on the mouldings.

Core particles to be coated may moreover be composed of metal oxides or comprise the same, examples being $Al_2O_3$, $ZrO_2$, $ZnO$, $Bi_2O_3$, $CeO_2$, ITO (indium oxide doped with tin(IV) oxide), ATO (tin(IV) oxide doped with antimony oxide), IZO (indium oxide doped with zinc oxide), mixed oxides and spinels, preferably with exclusion of $TiO_2$. Particular preference may be given to core particles to be coated comprising or composed of $Al_2O_3$. The use of a powder with a core made of metal oxide, in particular $Al_2O_3$, in a layer-by-layer process for producing mouldings may provide, in addition to a reinforcing effect, a metallic appearance, an increase of thermal conductivity and easier downstream operations on the mouldings.

Core particles to be coated may moreover be composed of metal nitrides or semimetal nitrides or comprise the same, an example being boron nitride or aluminium nitride. The use of a powder with a core made of metal nitrides or of semimetal nitrides, in particular boron nitride or aluminium nitride, in a layer-by-layer process for producing mouldings may provide both a reinforcing effect and an increase of thermal conductivity.

The respective metal oxide particles, metal nitride particles or semimetal nitride particles may be of spherical, lamellar or elongate form. The respective core particles may moreover be sharp-edged, rounded or smooth. The core particles mentioned may optionally be coated with sizes prior to application of the polymer coating.

The precipitated or precipitatable polymer is a polymer which can be dissolved in a liquid medium comprising a solvent and which precipitates in the form of a completely or partially insoluble deposit in the form of flakes or droplets, or in crystalline form, as a result of changes of certain parameters, e.g. temperature, pressure, solvent content, non-solvents, anti-solvents, or precipitants. The type of solvent and the solvent content as well as the other parameters for dissolving or precipitating the appropriate polymer are determined according to the properties of the polymer to be used as the coating, as is understood by one of ordinary skill in the art.

The precipitatable or precipitated polymer may be preferably selected from polymers, including polyolefins, polyethylene, polypropylene, polyvinyl chloride, polyacetal, polystyrene, polyimides, polysulphones, poly(N-methylmethacrylimides) (PMMI), polymethyl methacrylate (PMMA), polyvinylidene fluorides (PVDF), ionomer, polyether ketones, polyaryl ether ketones, polyamide, copolyamide and mixtures thereof, in particular mixtures of homo- and copolyamide.

In one preferred embodiment, the precipitatable polymer for coating the core particles is obtained through precipitation of at least one polyamide of the AABB type or through joint precipitation of at least one polyamide of the AB type and at least one polyamide of the AABB type. Preference may be given in this embodiment to co-precipitated polyamides, where at least nylon-11 or nylon-12 and at least one polyamide based on PA1010, PA1012, PA1212 or PA1013 is present.

The following precipitatable polymer and solvent combinations may be mentioned as examples. Polyolefins and polyethylene may be dissolved, for example in toluene, xylene and/or 1,2,4-trichlorobenzene. Polypropylene may be dissolved in toluene and/or xylene. Polyvinyl chloride may be dissolved in acetone. Polyacetal may be dissolved in DMF, DMAc and/or NMP. Polystyrene may be dissolved in toluene. Polyimides may be dissolved in NMP. Polysulphones may be dissolved in sulpholane. Poly(N-methylmethacrylimides) (PMMI) may be dissolved in DMAc and/or NMP. Polymethyl methacrylate (PMMA) may be dissolved in acetone. Polyvinylidene fluorides may be dissolved in N-methylpyrrolidone (NMP), dimethylformamide (DMF), dimethylacetamide (DMAc) and/or cyclohexanone. Polyether ketones and polyaryl ether ketones may be dissolved in diphenyl sulphone and/or in sulpholane. Polyamides may be dissolved in an alcoholic medium, preferably an ethanol-water mixture. As explained above, it may sometimes also necessary to adjust parameters such as temperature and pressure in order to dissolve a given polymer.

Once the relevant polymer has been dissolved, the dissolved polymer is precipitated in the presence of the core particles, in order to coat the core particles completely or partially with the relevant precipitated polymer. The precipitation of the polymer may be initiated and/or accelerated by changing the pressure, changing the temperature, changing (reducing) the concentration of the solvent, and optionally adding a non-solvent, anti-solvent and/or precipitant. In the case of amorphous polymers, such as polystyrene, sulphones, PMMI, PMMA, and ionomer, it may be necessary to add a non-solvent to precipitate the relevant polymer.

The precipitatable polymer may preferably be a polyamide which has at least 8 carbon atoms per carbonamide group. The polymer may particularly preferably be a polyamide which has 10 or more carbon atoms per carbonamide group. The polymer may very particularly preferably be a polyamide selected from nylon-6,12 (PA 612), nylon-11 (PA 11) and nylon-12 (PA 12). The production process for the polyamides that can be used in the sinter powders according to the invention is well-known and, for the production of PA 12, can be found for example, in the documents DE 29 06 647, DE 35 10 687, DE 35 10 691 and DE 44 21 454. The granulated polyamide material required may be purchased from various producers, for example, granulated nylon-12 material is available with trade name VESTAMID from Evonik Industries AG.

In a particularly preferred embodiment, the precipitated or precipitatable polymer coated at least partially onto the core particle may be nylon-12.

It may be moreover possible to use the corresponding copolyamides or mixtures of homo- and copolyamides which comprise at least 70 percent by weight of the units mentioned. Accordingly, they may comprise, as comonomers, from 0 to 30 percent by weight of one or more comonomers, such as caprolactam, hexamethylenediamine, 2-methyl-1,5-pentanediamine, 1,8-octamethylenediamine, dodecamethylenediamine, isophoronediamine, trimethylhexamethylenediamine, adipic acid, suberic acid, azelaic acid, sebacic acid, dodecanedioic acid, aminoundecanoic acid. The homo- and copolyamides mentioned, termed polyamides hereinafter, may be used in the form of granulated materials or ground material, where the relative solution viscosity of these is from 1.5 to 2.0 (measured in 0.5% m-cresol solution at 25° C. in accordance with DIN 53 727), preferably from 1.70 to 1.95. They may be produced by conventionally known methods, including polycondensation, or hydrolytic or acidolytic or activated anionic polymerization. It may be preferable to use unregulated polyamides having $NH_2/COOH$ end group ratios of from 40/60 to 60/40. However, it may also be advantageous to use regulated polyamides and specifically preferably those in which the $NH_2/COOH$ end group ratio is 90:10 and 80:20 or 10:90 and 20:80.

As previously explained above, the $d_{50}$ median diameter of the core particles is 1 µm or greater.

In one embodiment, the size of the core particles in all three spatial directions may be 1 µm or more. The core particles may be made of metal, metal oxide, metal nitride or semimetal nitride.

In another embodiment, the size of the core particles may be 1 µm or more in at least one spatial direction, and preferably, the size of the core particles in two spatial directions may be greater at least by a factor of 5 than in the third spatial direction. Such core particles may be made of metal, metal oxide, metal nitride or semimetal nitride.

In another preferred embodiment, the $d_{50}$ median diameter of the core particles which provide the core in the composite particle to be formed may be from 1 to 100 µm, preferably from 1 to 80 µm, with preference from 1 to 70 µm, more preferably from 1 to 60 µm, still more preferably from 1 to 50 µm, particularly preferably from 1 to 40 µm.

In another preferred embodiment, the core particles are metal particles and their $d_{50}$ median diameter is from 1 to 100 µm, preferably from 10 to 80 µm, with preference from 10 to 70 µm, more preferably from 10 to 60 µm, still more preferably from 10 to 50 µm, particularly preferably from 10 to 40 µm.

In another preferred embodiment, the core particles are metal oxide particles, metal nitride particles or semimetal nitride particles, and their $d_{50}$ median diameter may be from 1 to 100 µm, preferably from 1 to 80 µm, with preference from 1 to 60 µm, more preferably from 1 to 40 µm, still more preferably from 1 to 20 µm, particularly preferably from 1 to 15 µm and very particularly preferably from 1 to 10 µm.

In an alternative embodiment, the core particles are metal oxide particles, metal nitride particles or semimetal nitride particles, and their $d_{50}$ median diameter may be more than 10 µm, preferably from 10 to 80 µm, with preference from 10 to 70 µm, more preferably from 10 to 60 µm, still more preferably from 10 to 50 µm, particularly preferably from 10 to 40 µm.

Suitable particle size distributions may be ensured by known processes, e.g. sieving or sifting.

It may be moreover preferable that the $d_{50}$ median diameter of the composite particles is from 20 to 150 µm, with preference from 20 to 120 µm, preferably from 20 to 100 µm, more preferably from 25 to 80 µm and particularly preferably from 25 to 70 µm.

The ratio, based on weight, of the polymer to the core particles, based on the entirety of the composite particles, may preferably be from 0.1 to 30, with preference from 1.0 to 20.0 and more preferably from 1.3 to 10.0.

The ratio of the $d_{50}$ median diameter of the composite particles to the $d_{50}$ median diameter of the core particles may be from 1.15 to 30, preferably from 1.2 to 30, with preference from 1.5 to 25; preferably from 1.5 to 15, more preferably from 1.5 to 12 and particularly preferably from 1.5 to 10.

In another preferred embodiment, the ratio of the $d_{50}$ median diameter of the composite particles to the $d_{50}$ median diameter of the metal particles may be from 1.2 to 10, with preference from 1.5 to 5 and preferably from 1.5 to 3.

In another preferred embodiment, the ratio of the $d_{50}$ median diameter of the composite particles to the $d_{50}$ median diameter of the metal oxide particles, metal nitride particles or semimetal nitride particles may be from 2 to 30, with preference from 2.5 to 25; preferably from 2.5 to 15, more preferably from 2.5 to 12 and particularly preferably from 2.5 to 10.

In one preferred embodiment, the thickness of the coating of the precipitated polymer may be 1.5 µm or more, preferably 2, 3, 5, 10, 15, 20, 25 or 30 µm or more. In particular, the layer thickness for composite particles with metal core may preferably be from 2 to 50 µm, preferably from 5 to 35 µm.

In another preferred embodiment, the BET specific surface area of the powder according to the invention may be in the range from 1 to 60 $m^2/g$, preferably from 3 to 15 $m^2/g$; particularly preferably from 5 to 10 $m^2/g$. The bulk density BD of the powder according to the invention may moreover be in the range from 120 to 700 g/l, with preference from 220 to 450 g/l.

In another preferred embodiment, the density of the core particles may be either greater than the density of the solvent or not more than 20%, with preference not more than 15%, more preferably not more than 10% and particularly preferably not more than 5% smaller than the density of the solvent used for the precipitation of the polymer.

It may be particularly preferable to use an alkanol (for example: methanol, ethanol, propanol or butanol), preferably ethanol, as solvent for the precipitation of the polymer in the presence of the core particles, where the density of the core particles is greater or not more than 20%, with preference not more than 15%, more preferably not more than 10% and particularly preferably not more than 5% smaller than the density of the alkanol, preferably of ethanol.

The powder may comprise only the composite particles or may be admixed with, in uncompacted form, (dry-blend) fillers, and/or auxiliaries. The proportion of the composite particles in the powder may be at least 50% by weight, with preference at least 80% by weight, preferably at least 90% by weight, particularly preferably at least 95% by weight and very particularly preferably at least 99% by weight.

The powders according to the invention may optionally comprise auxiliaries and/or other organic or inorganic pigments. These auxiliaries may, for example, be powder-flow aids, e.g. precipitated and/or fumed silicas. Precipitated silicas are available with product name AEROSIL® with various specifications from Evonik Industries AG. It may be preferable that the powder according to the invention comprises less than 3% by weight of these auxiliaries, with preference from 0.001 to 2% by weight and very particularly preferably from 0.025 to 1% by weight, based on the entirety of the polymers present. The pigments may, for example, be titanium dioxide particles based on rutile (preferably) or anatase, or carbon black particles.

In order to improve processability or for further modification of the powder according to the invention, inorganic foreign pigments, e.g. transition metal oxides, stabilizers, e.g. phenols, in particular sterically hindered phenols, flow aids and powder-flow aids, e.g. fumed silicas, may optionally be added thereto.

The amount of the substances added to the polymers, based on the total weight of polymers in the polymer powder, may preferably be such as to provide compliance with the concentrations stated for auxiliaries for the powder according to the invention.

Ideal properties in the further processing of the powder may be achieved when the melting point of the polymer in the first heating procedure is greater than in the second heating procedure, as measured by differential scanning calorimetry (DSC); and when the enthalpy of fusion of the polymer in the first heating procedure is at least 50% greater than in the second heating procedure, measured by differential scanning calorimetry (DSC). When these conditions are met, the polymer content of the composite particles has higher crystallinity when compared with other powders which can be produced by processes other than co-precipitation of a dissolved polymer with core particles. A particularly suitable material for the laser sintering process is a nylon-12 which has a melting point of from 185 to 189° C., with preference from 186 to 188° C., an enthalpy of fusion of 112+/−17 kJ/mol, with preference from 100 to 125 kJ/mol, and a freezing point of from 138 to 143° C., preferably from 140 to 142° C.

An embodiment of the invention also includes a process for producing the composite particles, which comprises:

at least partially dissolving a polymer for the coating in a medium comprising a solvent which at least partially dissolves the polymer;

adding the core particles to the medium, before, during or after at least partially dissolving the polymer;

suspending the core particles in the medium; and then precipitating the polymer from the at least partial solution onto the core particles to obtain the composite particles;

wherein the $d_{50}$ median diameter of the core particles is 1 µm or greater and the ratio of the $d_{50}$ median diameter of the composite particles to the $d_{50}$ median diameter of the core particles is 1.15 or greater.

According to an embodiment of the invention, in order to produce an at least partial solution, a polymer is brought into contact, in the presence of core particles, with exposure to pressure and/or heat, with a medium comprising solvent which dissolves the polymer, and then the polymer is precipitated from the at least partial solution, and composite particles are obtained which are produced by core particles coated entirely or partially with a precipitated polymer, where the $d_{50}$ median diameter of the core particles is 1 µm or greater and the ratio of the $d_{50}$ median diameter of the composite particles to the $d_{50}$ median diameter of the core particles is 1.15 or greater.

In one preferred process, the $d_{50}$ median diameter of the core particles (core of the composite particle) may be from 1 to 100 µm, preferably from 1 to 80 µm, with preference from 1 to 70 µm, more preferably from 1 to 60 µm, still more preferably from 1 to 50 µm, particularly preferably from 1 to 40 µm.

In another preferred process, the core particles (core of the composite particles) are metal particles and their $d_{50}$ median diameter may be from 1 to 100 µm, preferably from 10 to 80 µm, with preference from 10 to 70 µm, more preferably from 10 to 60 µm, still more preferably from 10 to 50 µm, particularly preferably from 10 to 40 µm.

In another preferred process, the core particles (core of the composite particles) are metal oxide particles, metal nitride particles or semimetal nitride particles, and their $d_{50}$ median particle diameter may be from 1 to 100 µm, preferably from 1 to 80 µm, with preference from 1 to 60 µm, more preferably from 1 to 40 µm, still more preferably from 1 to 20 µm, particularly preferably from 1 to 15 µm and very particularly preferably from 1 to 10 µm.

The use of metallic core particles or core particles made of metal oxides, metal nitrides or semimetal nitrides which are in suspension in the solvent for the precipitatable polymer may be particularly important here. A feature of one preferred variant of the process of the invention is that a suspension of core particles suspended in the alcoholic medium is used, where the ($d_{50}$) median size of the core particles is the size stated above.

The $d_{50}$ median diameter of the composite particles produced by the production process may preferably be from 20 to 150 µm, with preference from 20 to 120 µm, preferably from 20 to 100 µm, more preferably from 25 to 80 µm and particularly preferably from 25 to 70 µm.

In a preferred process, the core particles to be coated with the precipitated polymer are selected from metal, metal oxides, metal nitrides and semimetal nitrides. In the composite particle, the said core particles made of metal, metal oxides, metal nitrides or semimetal nitrides provide the core. The powder produced by the process according to the invention preferably has a core-shell structure.

The size of the core particles provides advantages including less dusting and less static charging during the handling of the core particles and also of the composite particles per se. In the precipitation process, the flowability of the suspension may be higher for larger particles, i.e. for particles of size 1 µm or greater) when comparison is made with particles in the nanometer range, because the contact area is smaller. The use of metal particles or metal oxide particles, metal nitride particles or semimetal nitride particles moreover increases thermal conductivity and electrical conductivity.

Another advantage of the process according to the invention may be provided by saving an operation during the production of the powder, because there is no longer any need for the dry-blend mixing of polymer particles and auxiliary particles and/or filler particles.

In a preferred embodiment the precipitatable polymer of the coating is selected from the group consisting of polyolefins, polyethylene, polypropylene, polyvinyl chloride, polyacetal, polystyrene, polyimides, polysulphones, poly(N-methylmethacrylimides) (PMMI), polymethyl methacrylate (PMMA), polyvinylidene fluorides (PVDF), ionomer, polyether ketones, polyaryl ether ketones, polyamide, copolyamide, and mixtures thereof, in particular mixtures of homo- and copolyamide.

In another embodiment, the polymer for coating of the core particles may be obtained through precipitation of at least one polyamide of AABB type or through joint precipitation of at least one polyamide of AB type and of at least one polyamide of AABB type.

Preference may be given to co-precipitated polyamides here, where at least nylon-11 or nylon-12 and at least one polyamide based on PA1010, PA1012, PA1212 or PA1013 is present.

The type of solvent and the content of solvent, and also the other parameters for dissolving and reprecipitating the appropriate polymer, depend on the polymer and have already been explained above.

The following description relates to polymers which can be dissolved in the alcoholic medium, in particular polyamides. For the coating of core particles with polymers for which other solvents must be, or are, used, the parameters and solvents must be modified appropriately, as understood by one of ordinary skill in the art.

A feature of a preferred embodiment of the process of the invention may be that a suspension is used which is obtainable by suspending the core particles in the medium comprising solvent which dissolves the polymer, for example an alcoholic medium, with introduction of energy input greater than 1000 kJ/m$^3$. This generally already produces very useful suspensions of the core particles in the medium. The energy input mentioned may be achieved through known assemblies. Suitable assemblies include planetary-gear kneaders, rotor-stator machinery, an agitated ball mill, a roll mill or the like.

The suspensions that are useful for the invention may be produced in a medium comprising solvents which dissolve the precipitatable polymer for the coating, for example an alcoholic medium. In the case of an alcoholic medium, this may be a pure alcohol, a mixture of a plurality of alcohols, or else alcohols with content of water or of other substances which do not in essence have any disadvantageous effect on the desired reprecipitation of the polyamides. The alcoholic medium of the suspensions may preferably have less than 50% by weight content of non-alcoholic substances (preferably water), particularly preferably comprising less than 10% by weight, and particularly advantageously less than 1% by weight, of foreign non-alcoholic substances. The invention may generally use any of the types of alcohols or mixtures thereof which permit reprecipitation of polymers, preferably polyamides, under the desired conditions (pressure and temperature). In any particular case, it is relatively easy for the person skilled in the art to modify the system to meet specific requirements. The process of the invention preferably uses, as alcoholic medium for the reprecipitation of the polyamide and/or the suspension of the core particles, one or more alcohols which have a numeric ratio of oxygen atoms to carbon atoms in the range from 1:1 to 1:5.

Typical alcohols for producing the suspension of the core particles may be those where the ratio of oxygen to carbon is 1:1, 1:2, 1:3, 1:4 or 1:5, preferably those where the ratio of oxygen to carbon is 1:2 or 1:3, particularly preferably where the oxygen to carbon ratio is 1:2. It is very particularly advantageous to use ethanol for producing a suspension of the core particles, and also for the reprecipitation of the precipitatable polymer, preferably of the polyamides.

As explained above, the precipitatable polymer may be selected from polyolefins, polyethylene, polypropylene, polyvinyl chloride, polyacetal, polystyrene, polyimides, polysulphones, poly(N-methylmethacrylimides) (PMMI), polymethyl methacrylate (PMMA), polyvinylidene fluorides (PVDF), ionomer, polyether ketones, polyaryl ether ketones, polyamide, copolyamide and mixtures thereof, in particular mixtures of homo- and copolyamide. The precipitatable polyamide is dissolved in an appropriate solvent so that it can be reprecipitated on the surface of the core particles for coating the same.

Reprecipitatable polymers used for coating may preferably be polyamides. The precipitatable polymer may preferably be a polyamide which has at least 8 carbon atoms per carbonamide group. It may be particularly preferable that the polymer is a polyamide which has 10 or more carbon atoms per carbonamide group. Polyamides which may preferably be used as starting material for the process of the invention comprise inter alia nylon-11, nylon-12 and polyamides having more than 12 aliphatically bonded carbon atoms per carbonamide group, preferably nylon-12. It may also be possible to use the corresponding copolyamides or a mixture of homo- and copolyamides where these comprise at least 70 percent by weight of the units mentioned. They can accordingly comprise from 0 to 30 percent by weight of one or more comonomers, such as caprolactam, hexamethylenediamine, 2-methyl-L5-pentanediamine, 1,8-octamethylenediamine, dodecamethylenediamine, isophoronediamine, trimethylhexamethylenediamine, adipic acid, suberic acid, azeleic acid, sebacic acid, dodecanedioic acid or aminoundecanoic acid. The homo- and copolyamides mentioned and termed polyamides hereinafter are used in the form of granulated materials or ground material, where the relative solution viscosity of these is from 1.4 to 2.4 (measured in 0.5% m-cresol solution at 25° C. in accordance with DIN 53 727), preferably from 1.5 to 2.0, more preferably from 1.60 to 1.85. They may be produced by polycondensation, or hydrolytic or acidolytic or activated anionic polymerization, by known processes. It is preferable to use unregulated polyamides with $NH_2$/COOH end group ratios of from 40/60 to 60/40. The polyamide used may comprise at most 0.2 percent by weight of $H_3PO_4$. In a preferred embodiment the polyamide is $H_3PO_4$-free. However, it may also be advantageous to use regulated polyamides and specifically preferably those in which the $NH_2$/COOH end group ratio is 90:10 and 80:20 or 10:90 and 20:80.

Any of conventionally known methods may be used to produce the solution of the precipitatable polymers, preferably the polyamides, for the reprecipitation process. It may highly advantageous to achieve complete dissolution of the precipitatable polymers for the coating, preferably of the polyamide, in the appropriate medium, preferably an alcoholic medium, in the presence of the core particles suspended therein. Dissolution may be promoted by use of pressure and/or heat. In an advantageous procedure, the precipitatable polymer, preferably the polyamide, is initially present in the alcoholic medium and is dissolved with exposure to elevated temperature for the required time. The suspension of the core particles may be added prior to, during or after the dissolution of the precipitatable polymer, preferably the polyamide. The suspension of the core particles may advantageously be present together with the precipitatable polymer, preferably the polyamide, in the starting mixture. The dissolution procedure may be advantageously assisted by the use of appropriate agitation assemblies. The precipitation of the precipitatable polymer, preferably the polyamide, can equally be assisted by using pressure and/or heat, preferably using a temperature reduction and/or removal of the solvent, i.e. of the alcoholic medium, by distillation (preferably under reduced pressure) to precipitate the precipitatable polymer, preferably the polyamide. It may also be possible to assist the precipitation process by adding an anti-solvent (precipitant).

In another preferred process, after formation of the composite particles, a post-treatment may be carried out in a mixer with high shear. The temperature here may be particularly preferably above the glass transition temperature of the respective polymer. This measure serves to round the grains and improve powder-flowability.

The abovementioned parameters are determined as follows:

BET surface area was determined in accordance with DIN ISO 9277: 2003-05 with gas-adsorption equipment from Micromeritics for determining specific surface area by the BET method (Micromeritics TriStar 3000 V6.03: V6.03 refers to the software version of the Win3000 Software). BET surface area was determined by means of nitrogen gas adsorption by the discontinuous volumetric method (DIN ISO 9277:2003-05, Section 6.3.1.). For this, a number (seven) of measurement points were determined at relative pressures P/P0 from 0.05 to 0.20. He (purity at least 4.6 [99.996%] according to operating instructions, or at least 4.0 [99.99%] according to standard; this also applies to $N_2$) was used for dead volume calibration. The samples were devolatilized respectively for 1 hour at room temperature (21° C.) and 16 hours at 80° C. in vacuuo. The specific surface area was based on the devolatilized specimen. The evaluation used multipoint determination (DIN ISO 9277:2003-05, Section 7.2). The temperature during the measurement was 77 K.

The particle size ($d_{50}$ fineness) was determined by means of laser scattering. The measurements were carried out with a Malvern Mastersizer 2000. A dry measurement is involved here. For the measurement, in each case from 20 to 40 g of powder were metered into the system with the aid of Scirocco dry-dispersion equipment. The feed rate used to operate the vibrating trough was 70%. The pressure of the dispersion air was 3 bar. Each measurement involved a background measurement (10 seconds/10 000 individual measurements). The measurement time for the sample was 5 seconds (5000 individual measurements). The refractive index, and also the blue-light value, was defined as 1.52. Evaluation was based on the Mie theory.

Bulk density is calculated in accordance with DIN EN ISO 60.

Particle content is determined by ash/ignition residue determination in accordance with DIN EN ISO 3451 Part 1 and Part 4.

Solution viscosity was determined in 0.5% meta-cresol solution in accordance with ISO 307.

In another embodiment, the present invention includes a process for producing a moulded article, comprising:
applying a layer of the composite powder;
selectively melting at least one region of the layer by introduction of electromagnetic energy;
allowing the melted region to solidify;
applying another layer of composite powder and repeating the melting and solidification to perform a layer-by-layer process in which a molding having a structure according to the selective treatment is obtained;
wherein the melting selectivity is achieved by applying susceptors, inhibitors, or absorbers to each applied layer or by applying a mask to the applied layer.

Accordingly, regions of the respective powder layer are selectively melted through introduction of electromagnetic energy, where the selectivity is achieved by applying susceptors, inhibitors, or absorbers or by masks, where the powder comprises composite particles which are produced by core particles coated entirely or partially with a precipitated polymer, where the $d_{50}$ median diameter of the core particles, preferably metal particles, metal oxide particles, metal nitride particles or semimetal nitride particles, is 1 µm or greater and the ratio of the $d_{50}$ median diameter of the composite particles to the $d_{50}$ median diameter of the core particles is 1.15 or greater.

The present invention also provides mouldings obtained from the powder according to the invention by the abovementioned process. The moulding thus produced comprises (a) polymer(s) preferably selected from polyolefins, polyethylene, polypropylene, polyvinyl chloride, polyacetal, polystyrene, polyimides, polysulphones, poly(N-methylmethacrylimides) (PMMI), polymethyl methacrylate (PMMA), polyvinylidene fluorides (PVDF), ionomer, polyether ketones, polyaryl ether ketones, polyamide, copolyamide and mixtures thereof, in particular mixtures of homo- and copolyamide. In another embodiment, the polymer is at least one polyamide of AABB type or a mixture of at least one polyamide of AB type and of at least one polyamide of AABB type. Preference is given here to mixtures of polyamides where at least nylon-11 or nylon-12 and at least one polyamide based on PA1010, PA1012, PA1212 or PA1013 is present.

The layer by layer process with use of the powder according to the invention provides advantages, including that the powder no longer demixes, fewer cavities are produced in the component, and recyclability may be better. Additionally, the components have higher density and uniform quality, there is clear separation between molten and non-molten regions, and the components have low warpage. Further advantages may include increase in thermal conductivity and/or electrical conductivity.

The energy may be introduced through electromagnetic radiation, and the selectivity may be introduced by masks, or application of inhibitors, absorbers or susceptors, or else by focussing of the radiation, for example, by lasers. The electromagnetic radiation comprises the range from 100 nm to 10 cm, preferably from 400 nm to 10 600 nm or from 800 to 1060 nm. The source of the radiation may be a microwave generator, a suitable laser, a fibre laser, a radiant heat source or a lamp, or else a combination thereof. After cooling of all of the layers, the moulding can be removed.

Laser sintering processes are well known and are based on the selective sintering of polymer particles, where layers of polymer particles are briefly exposed to laser light and the polymer particles exposed to the laser light bond to one another. The successive sintering of layers of polymer particles produces three-dimensional objects. Details concerning the selective laser sintering process can be found by way of example in the documents U.S. Pat. No. 6,136,948 and WO 96/06881.

Other processes with good suitability are the SIB processes described in WO 01/38061, and a process described in EP 1 015 214. Both processes operate with large-surface-area infrared heating for melting of the powder.

The selectivity of the melting process is achieved in the first case by applying an inhibitor, and in the second process it is achieved by a mask. DE 103 11 438 describes another process. In this, the energy required for the fusion process is introduced through a microwave generator, and the selectivity is achieved by applying a susceptor.

Other suitable processes are those operating with an absorber which is either present in the powder or is applied by ink-jet processes, as described in DE 10 2004 012 682.8, DE 10 2004 012 683.6 and DE 10 2004 020 452.7.

A feature of the mouldings which are produced by a layer-by-layer process according to the present invention in which regions are selectively melted is that they comprise at least one polymer, and also one reinforcing material, and that the density of the composite component obtained is reduced in comparison to a component produced from conventional powder mixes. Susceptibility to warpage is moreover reduced, and an improvement is achieved in the reproducibility of mechanical properties in the moulding.

The mouldings may optionally comprise auxiliaries (the data here being as for the polymer powder), e.g. heat stabilizers, e.g. sterically hindered phenol derivatives. The mouldings preferably comprise less than 3% by weight of these auxiliaries, based on the entirety of the polymers present, particularly preferably from 0.001 to 2% by weight and very particularly preferably from 0.05 to 1% by weight.

Application sectors for the mouldings according to the present invention may be both in rapid prototyping and in rapid manufacturing. The latter certainly also may include small runs, i.e. the production of more than one identical part, where however production by means of an injection mould is not economic. Examples include parts for high specification cars of which only small numbers of units are produced, or replacement parts for motorsport, where availability time is important, as well as the small numbers of units. Sectors in which the parts are used may be the aerospace industry, medical technology, mechanical engineering, automobile construction, the sports industry, the household goods industry, the electrical industry, and the lifestyle sector.

The invention also provides the use of the powder according to the invention in a process for producing mouldings by a layer-by-layer process in which regions of the respective powder layer are selectively melted through introduction of electromagnetic energy, where the selectivity is achieved by applying susceptors, inhibitors, or absorbers or by masks, where at least one powder is used which comprises composite particles which are coated entirely or partially with a precipitated polymer, where the $d_{50}$ median diameter of the core particles is 1 μm or greater and the ratio of the $d_{50}$ median diameter of the composite particles to the $d_{50}$ median diameter of the core particles is 1.15 or greater.

Having generally described this invention, a further understanding can be obtained by reference to certain specific examples which are provided herein for purposes of illustration only and are not intended to be limiting unless otherwise specified.

The values measured for bulk density were determined by an apparatus in accordance with DIN EN ISO 60.

EXAMPLES

Example 1

Reprecipitation of Nylon-12 (PA 12) (Not According to the Invention)

400 kg of unregulated PA 12 produced by hydrolytic polymerization and having a relative solution viscosity of 1.62 and 75 mmol/kg of COOH end group content and 69 mmol/kg of NH$_2$ end group content were heated to 145° C. with 2500 l of ethanol denatured with 2-butanone and 1% water content, within a period of 5 hours in a 3 m$^3$ stirred tank (a=160 cm) and held at the said temperature for 1 hour, with stirring (blade stirrer, x=80 cm, rotation rate=49 rpm).

The jacket temperature was then reduced to 124° C. and the internal temperature was brought to 125° C. at the same stirrer rotation rate with continuous removal of the ethanol by distillation, with a cooling rate of 25 K/h. From this juncture onwards, with the same cooling rate, the jacket temperature was held at from 2K to 3 K below the internal temperature. The internal temperature was brought to 117° C., with the same cooling rate, and was then held constant for 60 minutes. Material was then removed by distillation with a cooling rate of 40 K/h, and the internal temperature was thus brought to 111° C. At the said temperature, the precipitation process began, discernible from the evolution of heat. The distillation rate was increased in such a way that the internal temperature did not rise beyond 111.3° C. After 25 minutes, the internal temperature fell, indicating the end of the precipitation process. The temperature of the suspension was brought to 45° C. by further removal of material by distillation and cooling by way of the jacket, and then the suspension was transferred to a paddle dryer. The ethanol was removed by distillation at 70° C./400 mbar, and the residue was then further dried for 3 hours at 20 mbar/86° C.

This gave a precipitated PA 12 with an average grain diameter of 55 μm. Bulk density was 435 g/l.

By analogy with the procedure indicated in Example 1 or in accordance with DE 19708146, a powder was produced with particles as core and with a shell made of PA12, PA 10.12, PA10.10, PA6.12, PA6.13, PA10.13, PA6.18 and PA12.18.

Example 2

Single-Stage Reprecipitation of PA12 with Core Particles (According to the Invention)

As in Example 1, a PA 12 produced by hydrolytic polymerization with a relative solution viscosity ($\eta_{rel}$) of 1.62 and with 75 mmol/kg of COOH end group content and 66 mmol/kg of NH$_2$ end group content was reprecipitated in the presence of core particles with the properties set out in Table 1:

TABLE 1

| Properties of the various core particles used in Example 2: | |
|---|---|
| Particle | $d_{50}$ |
| Al$_2$O$_3$ (Martoxid ® MN/Y 216) | >10 μm |
| Al$_2$O$_3$ (Martoxid ® DN 206) | 5-7 μm |
| Al$_2$O$_3$ (Martoxid ® MDLS-6) | 3-4 μm |
| Al$_2$O$_3$ (Martoxid ® MZS-1) | 1.5-1.9 μm |
| Stainless steel flakes | 31 μm |
| AS081 aluminium powder | 28 μm |

In this example, the precipitation conditions were altered in the following way in comparison with Example 1:

Precipitation temperature: 108° C.

Precipitation time: 150 min

Stirrer rotation rate: from 39 to 82 rpm

Table 2 collates the characterization (bulk density, diameter and BET surface area) of the powders produced in accordance with Example 2. Alongside this, Table 2 also gives the amounts used of polyamide, core particles and ethanol, and also the stirrer rotation rate used in the process.

TABLE 2

Characterization of the powders produced in accordance with Example 2

| RD rpm | SD g/L | $d_{50}$ μm | BET m²/g | EtOH L | PA kg | Particles kg |
|---|---|---|---|---|---|---|
| Aeroperl ® 300/30 | | | | | | |
| 44 | 321 | 54.7 | 31.6 | 2500 | 375 | 44 |
| 44 | 336 | 49 | 32 | 2500 | 375 | 44 |
| 39 | 272 | 42 | 30.2 | 2500 | 348 | 35 |
| 39 | 296 | 26 | 58.4 | 2500 | 348 | 105 |
| Martoxid ® MN/Y 216 | | | | | | |
| 53 | 411 | 67 | 4.5 | 2500 | 375 | 44 |
| 53 | 422 | 65.2 | 3.3 | 2500 | 375 | 44 |
| 39 | 371 | 67 | 5.1 | 2500 | 348 | 87 |
| 39 | 407 | 67 | 5.6 | 2500 | 348 | 174 |
| 82 | 340 | 37 | 10 | 2500 | 348 | 232 |
| 39 | 423 | 55 | 5.7 | 2500 | 348 | 348 |
| Martoxid ® DN 206 | | | | | | |
| 39 | 370 | 56 | 6 | 2500 | 348 | 174 |
| Martoxid ® MDLS-6 | | | | | | |
| 39 | 388 | 43 | 8.1 | 2500 | 348 | 174 |
| Martoxid ® MZS-1 | | | | | | |
| 39 | 321 | 36 | 10.1 | 2500 | 348 | 174 |
| Stainless steel flakes | | | | | | |
| 52 | 312 | 74 | 8.3 | 2500 | 348 | 87 |
| 52 | 297 | 68 | 8.4 | 2500 | 348 | 150 |
| 52 | 298 | 63 | 8.6 | 2500 | 348 | 232 |
| 39 | 327 | 83 | 7.3 | 2500 | 348 | 150 |
| 65 | 277 | 59 | 10.1 | 2500 | 348 | 150 |
| 78 | 339 | 66 | 7.7 | 2500 | 348 | 39 |
| 78 | 352 | 68 | 6.4 | 2500 | 348 | 17.5 |
| Aluminium powder | | | | | | |
| 65 | 381 | 57 | 4.6 | 3480 | 348 | 87.5 |

SR = stirrer rotation rate;
BD = bulk density

The invention claimed is:

1. A powder, comprising composite particles:
   wherein the composite particles, comprise:
   a core particle; and
   a coating of a precipitated polymer on the core;
   wherein
   a thickness of the precipitated polymer coating of the composite particle is from 1.5 to 35 μm,
   the core particle is at least one material selected from the group consisting of a metal, a metal nitride, a semimetal nitride and a metal oxide selected from the group consisting of $Al_2O_3$, $ZrO_2$, ZnO, $Bi_2O_3$, $CeO_2$, ITO (indium oxide doped with tin(IV) oxide), having a $d_{50}$ median diameter of from 1 to 100 μm,
   the precipitated polymer of the coating comprises at least one polymer selected from the group consisting of nylon-11, nylon-12, PA1010, PA1012, PA1212 and PA1013,
   the melting point of the precipitated polymer in a first heating procedure is greater than in a second heating procedure, as measured by differential scanning calorimetry (DSC),
   a ratio of a $d_{50}$ median diameter of the composite particles to the $d_{50}$ median diameter of the core particles is 1.15 to 30, and
   the melting point of the precipitated coating polymer is obtainable when the polymer is exposed to an electromagnetic energy.

2. The powder according to claim 1, wherein a $d_{50}$ median diameter of the composite particles is from 20 to 150 μm.

3. The powder according to claim 1, wherein a number average weight ratio of the polymer coating to the core particle, is from 0.1 to 30.

4. The powder according to claim 1, wherein a BET specific surface area of the composite particle is from 1 to 60 m²/g.

5. The powder according to claim 1, wherein an enthalpy of fusion of the precipitated polymer in the first heating procedure is at least 50% greater than in the second heating procedure, as measured by differential scanning calorimetry (DSC).

6. The powder according to claim 1, which further comprises at least one selected from the group consisting of a powder-flow aid, an organic pigment, an inorganic pigment, and a sterically hindered phenol.

7. The powder according to claim 6, wherein a content of the composite particles in the powder is at least 50% by weight.

8. A process for producing the composite particles according to claim 1, the process comprising: at least partially dissolving a polymer for the coating in a medium comprising a solvent which at least partially dissolves the polymer; adding the core particles to the medium, before, during or after at least partially dissolving the polymer; suspending the core particles in the medium; and then precipitating the polymer from the at least partial solution onto the core particles to obtain the composite particles.

9. The process according to claim 8, wherein a density of the core particles is not more than 20% smaller than the density of the solvent used for the precipitation of the polymer.

10. The process according to claim 8, wherein the solvent for the polymer is ethanol and a density of the core particles is not more than 20% smaller than the density of ethanol.

11. A process for producing a moulded article, the process comprising:
    applying a layer of the composite particles according to claim 1;
    selectively melting at least one region of the layer by introduction of electromagnetic energy;
    allowing the melted region to solidify;
    applying another layer of the composite particles and repeating the melting and solidification to perform a layer-by-layer process in which a molding having a structure according to the selective treatment is obtained;
    wherein the melting selectivity is achieved by applying susceptors, inhibitors, or absorbers to each applied layer or by applying a mask to the applied layer.

12. A moulded article obtained according to the process of claim 11.

* * * * *